July 28, 1953 V. LAWRENCE 2,646,830
APPARATUS FOR LOOSENING THE PITS OF DRUPES
Filed Nov. 8, 1949 2 Sheets-Sheet 2
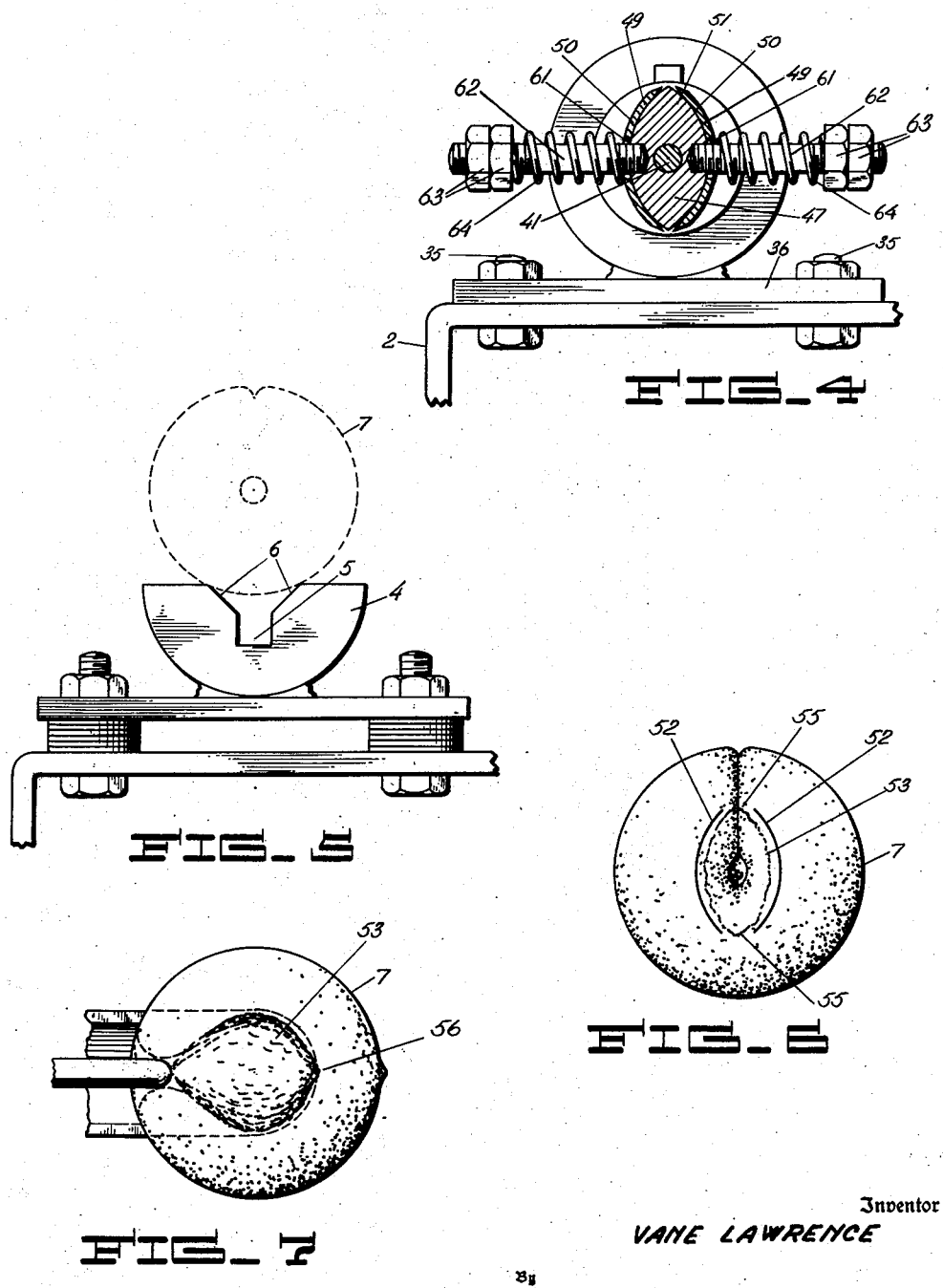
Inventor
VANE LAWRENCE
By
Attorneys Patented July 28, 1953

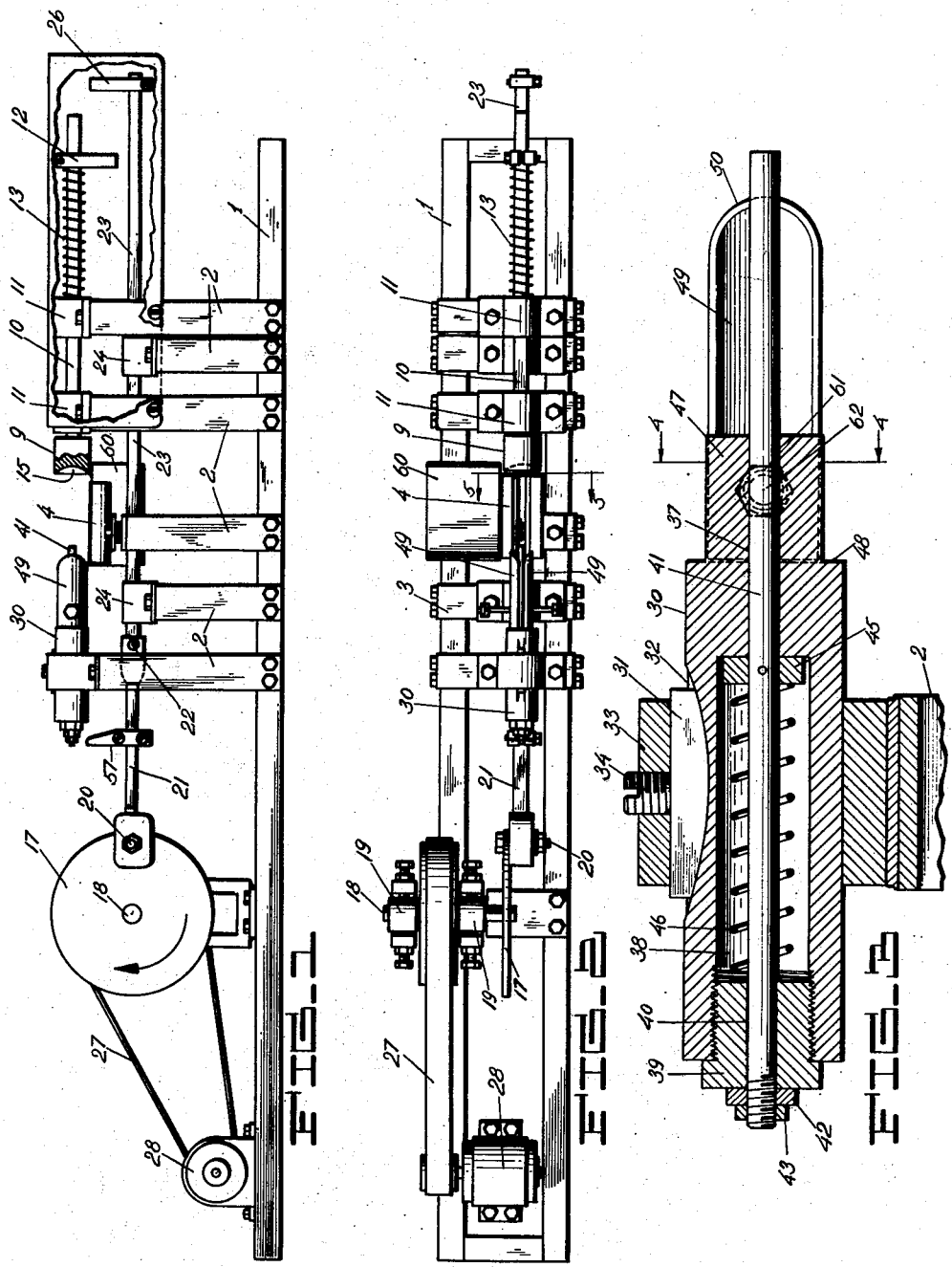

2,646,830

UNITED STATES PATENT OFFICE 2,646,830

APPARATUS FOR LOOSENING THE PITS OF DRUPES

Vane Lawrence, Menlo Park, Calif., assignor to Pratt-Low Preserving Co., Santa Clara, Calif., a corporation of California Application November 8, 1949, Serial No. 126,197

4 Claims. (Cl. 146—1)

This invention relates to a fruit and produce piercing machine, and has for one of its objects the provision of a machine that is adapted to quickly and neatly pierce the body of whatever fruit or produce is being prepared for further cooking, pickling or whatever further process is desired.

The present invention is particularly applicable for use on clingstone drupes, such as peaches, where the pit remains in the body of the fruit. Pickled or spiced peaches, for instance, are normally canned whole with the pit intact, and the pickle or spice solution must permeate to the pit from the outside to insure a satisfactorily pickled product. The eating of such peaches is quite difficult and hazardous, inasmuch as the outside meat or flesh of the peach is usually cut away from the pit by a spoon. The hazard exists irrespective of how the flesh is cut away inasmuch as the whole fruit is extremely slippery.

By the present method and machine, each peach is pierced adjacent a side of the pit by an elongated element that thus forms a passageway or slit for the entry of the syrup into the peach and at the same time the pit is partially loosened so that the meat outwardly of the pit readily falls away from the pit as soon as a cut is made to the said slit. Preferably, and by the present machine, elongated slits are cut along the two opposite sides of the pit, the width of such slits and their contour being such that in the final fruit the pit remains adhered to the outside body of flesh or meat along the edges of the pit defining its suture and at the blossom end of the pit. The transverse contour of the slit substantially follows the curvature of the opposite sides of the pit, and the slit opens outwardly of the body at the stem-end of the fruit only, whereby, the fruit bodies will give no noticeable impression of being different from conventionally pickled or spiced peaches in which the pit is connected with the flesh at all sides.

One of the primary objects of the invention is a machine that will produce the above results.

Another object of the invention is the method of preparing fruit for processing whereby the cooking or pickling steps are materially expedited.

A still further object of the invention is the provision of a new product resulting from the present process or method.

An added object is the provision of improved means for piercing fruit in a manner to expedite the further processing where cooking, soaking or other such processing is to be done, and which means also partially loosens the seed center of fruit to facilitate eating the finished product.

It may be pertinent to note that the present device is primarily intended for use with clingstone drupes, but its use is not necessarily restricted to such drupes, since it is readily adapted for use on any fruit or vegetable having a core or seed center, and where such fruit or vegetable is intended to be subjected to further processing in which the pre-piercing of the body of such fruit or vegetables will expedite such processing or will produce a superior finished product.

Other objects and advantages will appear in the description and in the drawings.

In the drawings,

Fig. 1 is a side elevational view of the machine hereinafter described, with a part of said machine at one end broken open to show structure.

Fig. 2 is a top plan view of the machine of Fig. 1.

Fig. 3 is an enlarged vertical sectional view of the portion of the machine that carries the piercing elements, including the latter.

Fig. 4 is an enlarged fragmentary sectional view taken along line 4—4 of Fig. 3.

Fig. 5 is an enlarged fragmentary view taken along line 5—5 of Fig. 2.

Fig. 6 is an end elevational view of a peach as seen from the stem-end after being pierced.

Fig. 7 is a side elevational view of a peach showing one of the piercing blades at about the preferred depth of penetration.

In detail, the machine illustrated in the drawings comprises a frame having an elongated base 1, upright frame members 2, on said base, and cross frame members 3 extending between the upper ends of said upright members.

At a point intermediate the ends of said base, one of said cross frame members supports a fruit holder 4 that virtually comprises an upwardly opening, and open ended, generally V shaped channel in which the apex of said V shape is downwardly enlarged or deepened as at 5 (Fig. 5) with the cross section contour of said enlarged portion being rectangular. The downwardly convergent sides of said channel at their upper ends provide a pair of spaced parallel tracks 6 on which the whole body 7 of a fruit such as a peach, is adapted to be slidably supported, and centered, for movement longitudinally of said holder 4. This holder extends longitudinally of the base 1.

The enlarged portion 6 provides a sump in which stems or other foreign material can drop, and such material is readily swept out of either open end of the holder.

Perhaps it will clarify further description to say that each drupe is initially positioned on tracks 6 of this holder by the operator with the suture of the drupe in a vertical plane bisecting the space between said tracks and with the stem and blossom ends of the drupe substantially parallel with the longitudinal axis of the holder.

A fruit engaging block 9 is positioned at one end of the holder but above the latter so that it may reciprocate longitudinally of the holder above the same.

This block 9 is carried at one end of a horizontally extending rod 10. This rod 10 extends in direction away from holder 4 and is supported for reciprocation in bearings 11 carried by several of the cross frame members 3. The end of said rod opposite block 9 is provided with a downwardly projecting arm 12, and an expansion coil spring 13 coaxial with said rod reacts between said arm 12 and the bearing 11 nearest thereto for retracting the block 9 to a position at one end of the holder 4 and adjacent the other bearing 11 that is nearest block 9. Rod 10 may be square in cross sectional contour to prevent rotation, but this is not essential inasmuch as arm 12 tends to project downwardly by gravity and to stay down. Insofar as the block 9 is concerned, it may be rotatable as well as reciprocable with the rod without impairing its efficiency, and in some instances it may be desirable that the block be rotatable relative to rod 10.

The block 9 is preferably cylindrical and coaxial with rod 10, and the free end face of said block that is generally directed toward this space over holder 4 is preferably formed with a concave spherical or conical laterally directed surface 15 (Fig. 1).

By the above structure, it will be seen that a drupe 7 positioned on holder 4 will be centered laterally on the holder by the convergent faces of tracks 6, and may be slid along said tracks longitudinally thereof along a straight line parallel with the tracks and centered in a plane bisecting the space between said tracks.

At the end of base 1 opposite the end supporting the rod 10 and block 4, is a crank disc 17 that is secured on one end of a horizontal shaft 18, which shaft, in turn, is journalled for rotation in bearings 19 that are secured on base 1.

The crank disc 17 is preferably circular, and has crank pin 20 projecting from a side thereof eccentrically of the shaft 18.

A pitman 21 is secured at one end to pin 20, and the opposite end of said pitman is connected by a wrist pin 22 with one end of a horizontally extending rod 23 that is spaced below rod 10 and that is parallel with the latter. Rod 23 is supported in bearings 24 for reciprocation.

The outer end of arm 23 opposite crank 17 terminates outwardly of the end of rod 10 that is thereabove, and the said outer end of arm 23 has an upstanding arm 26 secured thereto. This arm 26 overlaps the arm 12 that depends from the outer end of rod 10. Upon rotation of crank 17 and consequent reciprocation of rod 23, the arm 26 will engage arm 12 for a predetermined time during travel of rod 23 in direction toward crank 17, thereby moving rod 10 and the fruit engaging block 9 in the direction of said crank and against the resistance of spring 13. Upon movement of the rod 23 in direction away from crank 17 the spring 13 will return rod 10 and holder 9 to its original position.

The crank 17 may be rotated by any suitable means and at any desired speed. A motor 28 is indicated in the drawings as being on base 1 and connected by a belt 27 with a pulley 28. Obviously any conventional speed reducer or variable speed transmission may be employed between motor 28 and the crank if desired.

Between crank 17 and the fruit holder 4 is a horizontally extending blade holder 30, shown in detail in Fig. 3. This holder is supported above base 1 by several of the upstanding frame members 2, the holder being horizontally elongated and tubular and being releasably secured in position and against dislodgment by a key 31 held in a keyway 32 formed in the upper side of the holder. A ring 33 on frame members 2 surrounds the holder 30 and key 31 and a screw 34 threadedly extending through said ring and against said key 31 will secure the latter in place. Bolts 35 extending through a base 36 on the ring (Fig. 4) releasably secure rings 33 to the frame members 2.

The longitudinal axis of the holder 30 is coaxial with the rod 10, and the interior of holder 30 is formed with a bore 37 at its end adjacent the fruit holder or support 4, which bore opens directly outwardly of the blade holder at said end, said bore being coaxial with rod 10.

The opposite end of the blade holder 30 is enlarged by a counter bore 38 that opens outwardly of the holder at the end of the holder that is adjacent crank 17. The outer end of this counter bore is threaded for a plug 39 that in turn is formed with a through bore 40 coaxial with bore 37.

A horizontal rod 41 slidably extends through bores 37, 40 and projects outwardly of the bore 40 a short distance over the fruit holder 4. The opposite end of rod 41 is provided with a stop nut 42 that is threaded on said opposite end, which nut is outwardly of the plug 39, and a lock nut 43 outwardly of said nut 42 relative to plug 39 locks the stop nut in the desired position on the end of rod 40 against accidental loosening.

A collar 45 is secured on rod 41 adjacent bore 37 and an expansion coil spring 46 around rod 41 reacts between the collar and the plug 39 for yieldably urging the rod in direction toward the fruit engaging block 9 that is carried by rod 10 and that is coaxial with the rod 41.

The end 47 of blade holder 30 that is adjacent the fruit holder 4, is of generally elliptical cross sectional contour and of reduced thickness relative to the portion of the blade holder in which the counterbore is formed, thereby providing an axially directed shoulder 48 facing the fruit engaging block 9.

A pair of horizontally elongated transversely curved blades 49 have their concave opposedly directed sides fitted against the lateral opposite outer sides of the end portion 47 of the fruit holder. These blades are spaced apart by the portion 47 of blade holder 30, and one of the end edges of said blades about the shoulder 48.

The opposite ends of blades 49 project from the end portion 41 toward the front engaging block 9 a substantial distance which is preferably greater than the radius of the drupe 7 (Fig. 7). The outer end edges 50 of blades 49 that so project from portion 41 are sharpened and are preferably linearly convexly curved as seen in Fig. 3.

The end portion 47 has been described as being generally elliptical in cross sectional contour, which is correct, generally, in that said end portion has a major vertical axis and a minor horizontal axis transversely of its length. The opposed convexly curved lateral or vertically extending sides 50 (Fig. 4) substantially conform to the cross-sectional curvature of the opposite sides of a peach pit or of a drupe 7, that extend between the edges of the pit normal to the axis of the stem-blossom ends of the pit.

The concave opposed sides of blades 49 preferably have substantially the same curvature as sides 50, and also the longitudinal edges of said blades are preferably sharpened.

The outer ends of blades 49 terminate short of the end of rod 41 that is adjacent thereto hence rod 41 projects outwardly of the end edges of said blades. The distance said rod projects outwardly of the outer ends of the blades 49 is relatively short, and the space between the outermost end of rod 41 and the fruit engaging block 9 is greater than the stem-blossom diameter of the maximum drupe being processed.

The outer end of rod 41 is adapted to readily engage the stem end of a drupe, such as a clingstone peach, and this engagement is the first step in the processing of the fruit.

The following description will specifically refer to a clingstone peach inasmuch as that is the fruit indicated at 7 in Figs. 5, 6, 7 and the invention is very widely employed in the making of spiced or pickled whole clingstone peaches.

In operation, the operator first positions a peach 7 on support 4 with its suture in a vertical plane and with the stem end 51 (Fig. 7) directed toward the rod 41. The stem end of the fruit is then centered against the end of said rod and upon movement of the rod 23 in direction toward the crank disc 17, the arm 26 will engage the arm 12 and the fruit engaging block 9 will engage the blossom end of the fruit causing the blades 49 to pierce the fruit (Fig. 7) and to form an elongated slit 52 (Fig. 6) in the body of the fruit at opposite sides of the pit 53. The slits 52 extend longitudinally of the blades and are transversely curved as seen in Fig. 6 to substantially follow the contour of opposite sides of pit 53.

The length of the stroke of the rod 10 in direction toward blades 49 is sufficient to cause penetration of the blades 49 to the depth indicated in Fig. 7, or substantially the length of the pit 53. As the longitudinally extending edges of blades 49 are spaced apart, it will be seen that the meat of the peach remains adhered to the pit at 55 (Fig. 6) along the edges of the pit and at 56 between the blossom ends of the pit and fruit body.

In the event an undersized peach (less than the maximum size) is centered on the fruit holder 4, the peach will be centered at its blossom end in the concave face 15 of the fruit engaging block 9, thus automatically properly centering the longitudinal axis of the pit relative to the central axis of rods 10, 41.

As the peach is moved toward blades 49 and to the position indicated in Fig. 7, the rod 41 is retracted against the resistance of the spring around rod 41 and at the same time the end of rod 41 that carries the nuts 42, 43 is moved away from the blade holder in direction toward the crank disc 17.

In many instances the tension of spring 46 is sufficient to cause the peach to be pushed off the blades, but this spring is not entirely relied upon for this purpose. Instead, a cam arm 57 is secured on the pitman 21 in a position to engage the retracted end of rod 41 on the upper quarter of the down stroke of the crank pin 20, thus positively causing the rod 41 to eject the peach from the blades, the ejected peach then being caused to fall onto the laterally directed chute 60 for delivery of the peach to any desired point.

The blades 49 are coaxially apertured at 61 (Fig. 3) for passage of the ends of stud bolts 62 loosely therethrough into portion 47 of the holder 30. These stud bolts 62 are in horizontal coaxial alignment perpendicular to the longitudinal axis of blade holder 30, and each has a pair of lock nuts 63 threaded on its outer end. An expansion coil spring 64 around each bolt 62 reacts between the lock nuts 63 and the end of the blade that extends over portion 47 of the blade holder, thus yieldably holding the blades parallel against opposite sides of portion 47.

By the foregoing structure the blades 49 will be held against the shoulder 48 of the blade holder from moving axially during the piercing action of the blades, but said blades may spread apart to accommodate excessively large pits, or they may have relative pivotal movement about the axis of stud bolts 62 or similar pivotal action about said axis irrespective of whether the blades are spread apart or not. Thus, neither the fruit nor the blades can be injured due to misplaced, deformed, or excessively large pits. Each blade has virtually universal movement about the blade retaining means and such movement may occur with one blade or the other or with both, according to the character of the resistance offered by the pit.

The final product of the process or method is a clingstone drupe that has a pair of slits respectively along each of the two opposite sides of the pit for permitting ingress of the pickling syrup or the like to the interior of the drupe, thereby insuring a faster and more uniform distribution of the syrup in the body of the drupe. However, of particular importance is the fact that the pit is loosened, but not separated from the body of the fruit.

This results in a product that is readily eaten inasmuch as flesh or meat readily separates from the pit once the spoon, fork or knife is cut to one slit or the other. The peach itself normally bears no noticeable evidence of the slits, until they are eaten, thereby retaining their desired whole appearance when in the jars, cans and when served on the table.

I claim:

1. A machine for partially loosening the pit within a clingstone drupe that comprises drupe supporting means for supporting a drupe for movement along a straight path of travel longitudinally of its stem-blossom axis, a pair of parallel, elongated blades parallel with said path and at opposite sides of said axis, said blades being transversely curved with their concave sides in opposed relationship and substantially conforming to the cross-sectional contour of the opposite sides of said pit at opposite sides of the plane of its suture, drupe engaging means coaxial with said axis spaced from one of the ends of said blades supported for reciprocable movement toward and away from said blades, said drupe supporting means extending between said drupe engaging means and said blades and offset to one side of said axis for moving a drupe on said drupe supporting means onto said blades, with the latter extending into said drupe, means for reciprocating said drupe engaging means, and means for moving a drupe off said blades upon movement of said drupe engaging means away from said blades.

2. A machine for partially loosening the pit within a clingstone drupe that comprises drupe supporting means for supporting a drupe for movement along a straight path of travel longitudinally of its stem-blossom axis, a pair of parallel, elongated blades parallel with said path and at opposite sides of said axis, said blades being transversely curved with their concave sides in opposed relationship and substantially conforming to the cross-sectional contour of the opposite sides of said pit at opposite sides of the plane of its suture, drupe engaging means coaxial with said axis spaced from one of the ends of said blades supported for reciprocable movement toward and away from said blades, said drupe supporting means extending between said drupe engaging means and said blades and offset to one side of said axis for moving a drupe on said drupe supporting means onto said blade with the latter extending into said drupe, means for reciprocating said drupe engaging means, and means for moving a drupe off said blades upon movement of said drupe engaging means away from said blades, a support for pivotally supporting said blades at their ends remote from said drupe engaging means extending between said blades, means for yieldably holding said blades against opposite sides of said support, and means on said support holding said blades against longitudinal movement in direction away from said drupe engaging means.

3. A machine for partially loosening the pit within a clingstone drupe that comprises drupe supporting means for supporting a drupe for movement along a straight path of travel longitudinally of its stem-blossom axis, a pair of parallel, elongated blades parallel with said path and at opposite sides of said axis, said blades being transversely curved with their concave sides in opposed relationship and substantially conforming to the cross sectional contour of the opposite sides of said pit at opposite sides of the plane of its suture, drupe engaging means coaxial with said axis spaced from one of the ends of said blades supported for reciprocable movement toward and away from said blades, said drupe supporting means extending between said drupe engaging means and said blades and offset to one side of said axis for moving a drupe on said drupe supporting means onto said blades with the latter extending into said drupe, means for reciprocating said drupe engaging means, and means for moving a drupe off said blades upon movement of said drupe engaging means away from said blades, a support for said blades at their ends remote from said drupe engaging means, means floatingly securing said blades to said support for movement in a direction toward and away from each other and in planes at right angles to said direction, means for yieldably holding said blades parallel and parallel with said path of travel of the drupe.

4. A machine for partially loosening the pit within a clingstone drupe that comprises drupe supporting means for supporting a drupe for movement along a straight path of travel longitudinally of its stem-blossom axis, a pair of parallel, elongated blades parallel with said path and at opposite sides of said axis, said blades being transversely curved with their concave sides in opposed relationship and substantially conforming to the cross sectional contour of the opposite sides of said pit at opposite sides of the plane of its suture, drupe engaging means coaxial with said axis spaced from one of the ends of said blades supported for reciprocable movement toward and away from said blades, said drupe supporting means extending between said drupe engaging means and said blades and offset to one side of said axis for moving a drupe on said drupe supporting means onto said blades with the latter extending into said drupe, means for reciprocating said drupe engaging means, and means for moving a drupe off said blades upon movement of said drupe engaging means away from said blades, said last mentioned means comprising a positioning member supported between said blades for reciprocation longitudinally of said blades, one end of said member being adjacent the ends of said blades that are nearest said drupe engaging means and being adapted to enter the recess in the stem-end of a drupe, means for yieldably urging said member to a position with its said one end spaced outwardly of the adjacent ends of said blades.

VANE LAWRENCE.

References Cited in the file of this patent

UNITED STATES PATENTS

| Number | Name | Date |
| --- | --- | --- |
| 236,477 | Baldwin | Jan. 11, 1881 |
| 707,700 | Jacobs | Aug. 26, 1902 |
| 1,010,848 | Bodman et al. | Dec. 5, 1911 |
| 1,159,575 | Eckles | Nov. 9, 1915 |
| 1,206,659 | Bethke | Nov. 28, 1916 |
| 1,362,807 | Lewis | Dec. 21, 1920 |
| 1,477,106 | Caldwell | Dec. 11, 1923 |
| 1,498,078 | Duncan | June 17, 1924 |
| 2,029,344 | Sheldon | Feb. 4, 1936 |
| 2,034,490 | Schnack | Mar. 17, 1936 |
| 2,300,212 | Farmer | Oct. 27, 1942 |
| 2,326,407 | Steinwand | Aug. 10, 1943 |
| 2,380,530 | Jepson | July 31, 1945 |
| 2,531,927 | Waters | Nov. 28, 1950 |
| 2,549,008 | Rasaka | Apr. 17, 1951 |

OTHER REFERENCES

California Agricultural Extension Service Circular 10, "The Home Preparation of Fruit Candy," page 13.